Patented Feb. 23, 1926.

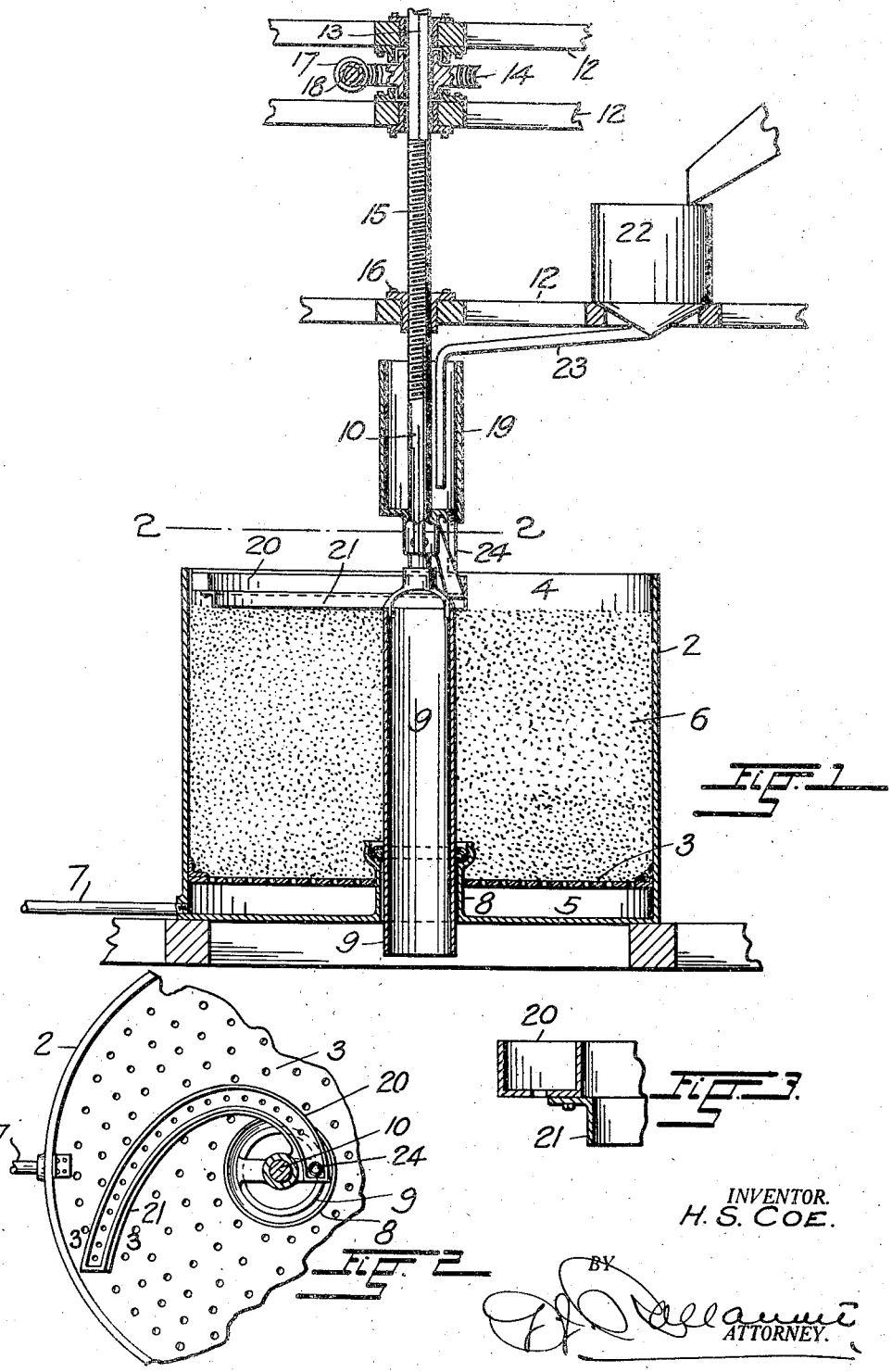

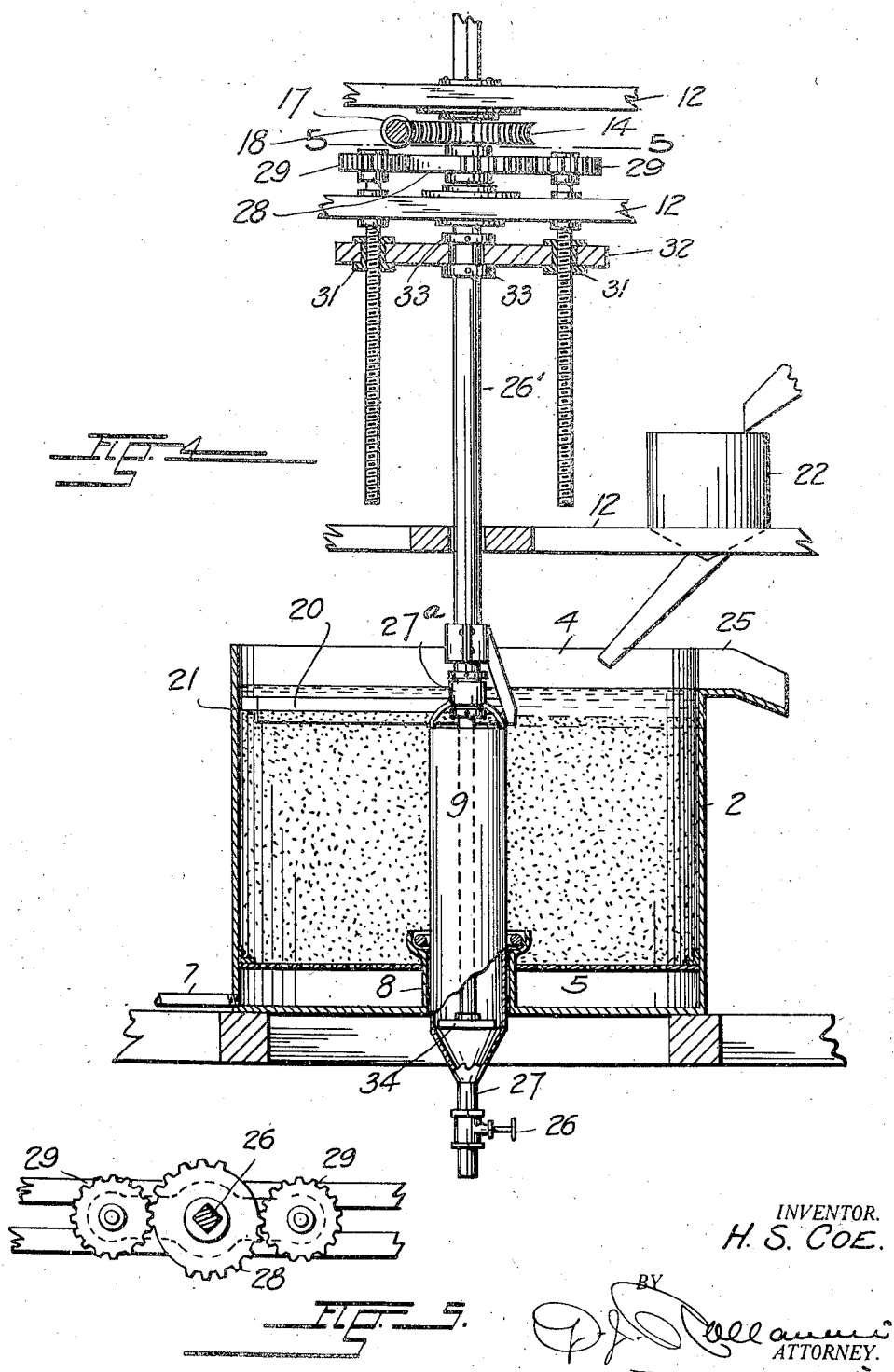

1,574,556

UNITED STATES PATENT OFFICE.

HARRISON S. COE, OF MOUND CITY, KANSAS, ASSIGNOR, BY MESNE ASSIGNMENTS, TO THE CYCLE COMPANY, OF COLORADO SPRINGS, COLORADO, A CORPORATION OF COLORADO.

FILTER.

Application filed August 13, 1919. Serial No. 317,237.

*To all whom it may concern:*

Be it known that I, HARRISON S. COE, a citizen of the United States, residing at Mound City, in the county of Linn and State of Kansas, have invented certain new and useful Improvements in Filters, of which the following is a specification.

This invention relates to a process and apparatus for the clarification of dirty waters such as those obtained in the performance of metallurgical and chemical processes, and it is particularly adapted for the filtration of pulps and other materials which are unsuited for treatment in ordinary filters by reason of the fineness of their solids or the nature of their chemical constituents.

It is the primary object of my invention to provide a method of filtration in which a continuous action at a maximum efficiency is obtained by the automatic removal of the fouled portion of the filtering medium, and another object of the invention resides in the provision of an apparatus for carrying the process into effect, which combines simplicity of construction with ample capacity for the treatment of a continuous feed.

A further object of my invention is to provide a filtering apparatus which may be operated for an indefinite period without any renewal or repair of parts, excepting the replenishment of the filtering vessel after all the filtering medium originally contained therein has been discharged.

With the above and other objects in view, all of which will fully appear in the course of the following description, the improved apparatus used in the practice of the filtering process, consists of the construction, arrangement and combinations of parts shown in the accompanying drawings in the several views of which like parts are similarly designated and in which Figure 1 is a sectional elevation of my improved filter in its preferred form;

Figure 2, a fragmentary section taken on the line 2—2, Figure 1;

Figure 3, an enlarged transverse section through the distributing trough and the scraper of the apparatus, taken at right angle through said trough;

Figure 4, a sectional elevation of a filter of modified construction, and

Figure 5, a section no the line 5—5, Figure 4.

Referring first to Figures 1 to 3 of the drawings, the reference character 2 designates a preferably cylindrical tank which by a perforated partition 3 is divided into upper and lower compartments 4 and 5.

The upper compartment contains a filtering medium 6 such as sand, charcoal, or other suitable granular material, and the comparatively shallow lower compartment is designed to receive the liquid percolating through the filtering medium and may if so desired be connected with an exhaust-fan or other suction producing machine through the medium of a conduit 7.

The tank has in the center of its bottom a stuffing box 8 of suitable construction for the water-tight passage of a cylindrical open-ended conduit 9 which in the operation of the device provides a well for the discharge of the residue and upper strata of the filtering medium, as will hereinafter be more fully described.

In the operation of the apparatus the well is gradually lowered through the filtering medium the upper portion of which is at the same time scraped into the orifice of the well at the upper end thereof. The movement of the well may be continuous or it may take place at intervals according to the nature of the material under treatment and the condition of the filtering medium, and the mechanism by which this continuous or intermittent motion is produced may be of any suitable construction.

In Figure 1 of the drawings a mechanism of simple construction is shown, for the continuous movement of the well and in the modified construction illustrated in Figures 4 and 5, the mechanism is designed for intermittent operation to move the well at regular intervals.

In the construction shown in Figure 1, the conduit is suspended from a vertical shaft 10 which is rotatably supported in bearings on a structure 12 erected above the tank.

The shaft has a squared portion 13 that extends slidingly through a worm-wheel 14, and a screw-threaded portion 15 that cooperates with a fixed nut 16 on the supporting structure.

A worm 17 on a driving shaft 18 meshes with the worm-wheel to rotate the shaft 10 and to simultaneously impart a downward longitudinal movement thereto through the action of the screw-thread in the relatively stationary nut.

The shaft 10 carries a feed bowl 19 and below the same a distributing trough 20 which extends radially inside the tank to the interior circumferential surface thereof.

The shaft carries, furthermore, a scraper 21 which curves in the direction of its rotation to the circumference of the tank in a plane with the upper edge of the well.

The bowl 19 receives the feed from a superposed hopper 22 through a pipe 23 and it discharges its contents into the distributing trough through a conduit 24 in its bottom.

The distributing trough discharges the material onto the surface of the filtering medium in the upper compartment of the tank, through holes in its bottom, and for convenience in construction, it is made in conformity with the scraper and rigidly secured thereto, as best shown in Figure 2 of the drawings.

In the operation of my invention, the material is continuously fed onto the surface of the filtering medium through the openings of the distributing tank, the liquid in the material percolating through the filtering medium into the receiving compartment 5, while the solid residue remains on the surface of the filtering medium until it is moved into the central well by the action of the scraper.

Inasmuch as in the operation of the filter the well is gradually lowered, the scraper removes together with the residue of the material under treatment, the upper strata of the filtering medium which were fouled by contact therewith, and the filtering medium is in consequence maintained constantly in a condition of maximum porosity.

After all the filtering material has been discharged from the tank, the latter is refilled wtih either fresh filtering material or with the filtering material separated from the residue discharged through the central well.

The process may be expedited by the production of a partial vacuum in the receiving compartment of the tank, and by the provision of more than one scraper and distributing trough if the nature of the material under treatment permits of a more rapid removal of the residue.

The scraper may be of any suitable construction which adapts it to move all the material settling upon the surface of the filtering medium toward the entrance of the central well.

It will be seen from the above description that my improved filter operates as a dewaterer as well as a strainer and as such its capacity may be increased by restricting the outflow of the discharge well and providing an overflow for the liquid rising out of the solids settling on the surface of the filtering medium.

An apparatus thus modified has been shown in Figure 4 of the drawings in which the reference character 25 designates a peripheral overflow at the upper edge of the tank and 26 a valve which controls the flow of material through a spout 27 at the lower end of the conduit 9.

In the operation of the apparatus, the feed and discharge are regulated to maintain the liquid in the material above the level of the overflow.

The solids in the material settle on the surface of the filtering medium and are in a thickened condition moved into the central conduit together with the upper strata of the filtering medium while part of the liquid percolates through the filtering medium as before, and another part passes across the overflow.

After the thickened matter congregated on the surface of the filtering medium, is together with the upper strata of the latter, discharged from the well through the valve-controlled spout, it may, if so desired, be separated from the filtering material and retained for other uses while the filtering material is returned to the filter to form a new filtering bed after the tank has been emptied.

The mechanism for lowering the well through the filtering medium, as shown in Figures 4 and 5, is adapted for intermittent operation to remove the upper strata of the filtering medium and the thereon deposited thickened matter, at regular intervals.

It will be understood, however, that mechanism for the continuous removal of the settled matter may be applied to this form of my invention as well as to that shown in Figure 1 and that on the other hand the well of the last-mentioned construction may be lowered intermittently through the filtering medium, if the conditions require the material under treatment to settle through longer periods.

The well 9 of the machine shown in Figures 4 and 5 is suspended from a partially squared shaft 26' through the medium of a swivel-joint 27ª and the scraper 20 is fastened to the shaft as before.

The shaft is continuously rotated through the medium of a worm-wheel 14 on its squared portion, and a worm 17 on a driving shaft 18 as in the first described form of my invention, but its downward movement is periodically interrupted through the action of an intermittent gearing applied to the shaft in addition to the other.

The gearing consists of a mutilated gear-wheel 28 on the squared portion of the shaft, the toothed segments of which mesh with pinions 29 at the upper ends of screw-shafts 30, which work in nuts 31 on a bar 32 placed crosswise of the shaft 26'.

The last-mentioned shaft rotates in an opening of the cross-piece and is compelled to follow the up and downward movement thereof, by collars 33.

When in the operation of the mechanism the toothed segments of the mutilated gear-wheel, move into engagement with the pinions at opposite sides thereof, the consequent rotation of the screw-shafts 30 in the nuts 31 will cause the cross-piece to lower and through the medium of the collars 33 impart a downward movement to the shaft 26' and the therewith connected well which is held against rotation by its frictional contact with the material through which it extends.

The shaft has been extended into the well and it carries at its lower end, a paddle 34 to stir the thickened matter in the bottom of the well and thereby facilitate its discharge through the restricted outlet.

Having thus described my invention what I claim and desire to secure by Lettters-Patent is:

1. A filter comprising a vessel containing a column of filtering material, means for feeding liquid upon the column, means for withdrawing filtrate therefrom and mechanism operative upon the surface of the filtering material where the liquid enters the column to successively remove successive layers thereof together with the deposit contained thereon.

2. A filter comprising a vessel containing a column of filtering material means for feeding liquid upon the column, means for withdrawing filtrate therefrom and mechanism operative to successively remove successive layers of the filtering material together with the deposit contained thereon, including means for successively advancing the mechanism in the axial direction of the column.

3. A filter comprising a vessel containing a column of filtering material, means for feeding liquid upon the column, means for withdrawing filtrate therefrom and mechanism operative to successively remove successive layers of the filtering material together with the deposit contained therein, including means defining a well in the column, means for maintaining the upper edge of the well in a definite relation to the surface of the column, scraper means and means for successively advancing the scraper means in the axial direction of the column.

4. A filter comprising a tank having means for the discharge of percolated liquid, a filtering medium in the tank, a well having a downward movement through the filtering medium, and means to move the upper strata of said medium to the well.

5. A filter comprising a tank having an overflow and means for the discharge of percolated liquid, a filtering medium in the tank, a well having a downward movement through the filtering medium and having a regulatable outlet, and means to move the upper strata of said medium to the well.

6. A filter comprising a tank having means for the discharge of percolated liquid, a filtering-medium in the tank, a well having a downward movement through the filtering medium, and a mechanically operated scraper for moving the upper strata of the filtering medium to the well, mounted to move in conjunction with the well.

7. A filter comprising a tank having means for the discharge of percolated liquid, a filtering medium in the tank, a well having a downward movement through the filtering medium, a trough discharging onto the surface of the same, and a scraper for moving the upper strata of the filtering medium, to the well, the trough and scraper being mounted to move in conjunction with the well.

8. A filter comprising a tank, a perforated partition dividing the same in upper and lower chambers, a filtering medium in the upper chamber, a central conduit passing through the chambers and having a downward movement, and a scraper for moving the upper strata of the filtering medium to the conduit, mounted to move in conjunction with the conduit.

9. A filter comprising a tank, a perforated partition dividing the same in upper and lower chambers, a suction-device connected with the lower chamber, a filtering medium in the upper chamber, a central conduit passing through the chambers and having a downward movement, and a scraper for moving the upper strata of the filtering medium to the conduit, mounted to move in conjunction with the conduit.

10. A filter comprising a tank having means for the discharge of percolated liquid, a filtering medium in the tank, a rotary and longitudinally movable shaft, an open-ended conduit connected with the shaft and passing through the filtering medium in the tank, a scraper on the shaft for moving the upper strata of the filtering medium to the conduit, and means for imparting a downward movement to the shaft to lower the conduit in the tank.

11. A filter comprising a tank having means for the discharge of percolated liquid, a filtering medium in the tank, a rotary and longitudinally movable shaft, an open-ended conduit connected with the shaft and passing through the filtering medium in the tank, a scraper on the shaft for moving the upper strata of the filtering medium to the conduit, a stirrer on the shaft, within the conduit, and means for imparting a downward movement to the shaft to lower the conduit in the tank.

12. The process of separating solid material from a liquid carrying the same in suspension, which consists in passing the liquid together with the material suspended therein onto a body of filtering material under conditions such as to cause the liquid to pass through the same, and successively removing from the surface where the material enters the body, layers of filtering material together with the solid particles deposited thereon until the desired amount of the filtering material is removed.

13. The process of separating solid material from a liquid carrying the same in suspension, which consists in passing the liquid together with the material suspended therein, downwardly onto a body of filtering material and successively removing layers of the filtering material together with the solid particles deposited thereon from the upper surface of the body of filtering material until substantially all of the latter is removed.

14. The process of separating solid material from a liquid carrying the same in suspension, which consists in passing the liquid together with the material suspended therein, downwardly onto a column of filtering material, removing the liquid passing out of the column at the bottom thereof and successively removing the upper surface of the column layers of the filtering material together with the solid material deposited thereon until the desired amount of the filtering material is removed.

In testimony whereof I have affixed my signature.

HARRISON S. COE.